US010239152B2

(12) United States Patent
Carlson et al.

(10) Patent No.: US 10,239,152 B2
(45) Date of Patent: Mar. 26, 2019

(54) FRICTION STIR WELDING BOBBIN TOOL (71) Applicant: GM GLOBAL TECHNOLOGY OPERATIONS LLC, Detroit, MI (US)

(72) Inventors: Blair E. Carlson, Ann Arbor, MI (US); Robert T. Szymanski, Saint Clair Township, MI (US); Yuri Hovanski, West Richland, WA (US); Spyros P. Mellas, Waterford, MI (US); Kenneth Ross, West Richland, WA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/498,204

(22) Filed: Apr. 26, 2017

(65) Prior Publication Data
US 2017/0304934 A1 Oct. 26, 2017

Related U.S. Application Data (60) Provisional application No. 62/327,778, filed on Apr. 26, 2016.

(51) Int. Cl.
*B23K 20/12* (2006.01)

(52) U.S. Cl.
CPC ...... *B23K 20/1255* (2013.01); *B23K 20/1265* (2013.01)

(58) Field of Classification Search
CPC .................................... B23K 20/122–20/128
USPC ................................................ 228/112.1, 2.1
See application file for complete search history.

(56) References Cited

U.S. PATENT DOCUMENTS

| 5,794,835 A * | 8/1998 | Colligan | B23C 5/22 228/13 |
| 8,875,980 B2 * | 11/2014 | Saito | B23K 20/125 228/112.1 |
| 2003/0098335 A1 * | 5/2003 | Saeki | B23K 20/1255 228/112.1 |
| 2006/0065694 A1 * | 3/2006 | Stol | B23K 20/1255 228/2.1 |
| 2010/0288820 A1 * | 11/2010 | Aliaga | B23K 20/123 228/112.1 |

(Continued)

FOREIGN PATENT DOCUMENTS

| CN | 204449622 U | * | 7/2015 |
| JP | 2013027921 A | * | 2/2013 |

(Continued)

*Primary Examiner* — Kiley S Stoner
(74) *Attorney, Agent, or Firm* — Reising Ethington P.C.

(57) ABSTRACT

A bobbin tool is disclosed that includes a top shoulder, a bottom shoulder, and an axial pin that extends between the top and bottom shoulders. The bottom shoulder has an annular shoulder end surface, a back surface opposite the annular shoulder end surface, and a side surface that joins the annular shoulder end surface and the back surface. One or more and radially-extending blades may be disposed on the side surface of the bottom shoulder and/or one or more axially-extending blades may be disposed on the back surface. The one or more blades provide the bobbin tool with an ability to friction stir weld a variable thickness workpiece assembly, axially plunged through the workpiece assembly along an axis of rotation of the bobbin tool, and/or be extracted through the workpiece assembly along an axis of rotation of the bobbin tool.

14 Claims, 3 Drawing Sheets

(56) References Cited

U.S. PATENT DOCUMENTS

2012/0273113 A1* 11/2012 Hovanski .......... B23K 20/1255
156/73.5

FOREIGN PATENT DOCUMENTS

| JP | 2013103251 A | * | 5/2013 |
| WO | WO 2012098810 A1 | * | 7/2012 |
| WO | WO 2012099152 A1 | * | 7/2012 |

* cited by examiner

FRICTION STIR WELDING BOBBIN TOOL

This application claims the benefit of U.S. Provisional Application No. 62/327,778 filed on Apr. 26, 2016. The entire contents of the aforementioned provisional application are incorporated herein by reference.

STATEMENT AS TO RIGHTS TO INVENTIONS MADE UNDER FEDERALLY-SPONSORED RESEARCH AND DEVELOPMENT

This invention was made with Government support under Contract DE-AC0576RL01830 awarded by the U.S. Department of Energy. The Government has certain rights in the invention.

TECHNICAL FIELD

The technical field of this disclosure relates generally to friction stir welding and a bobbin tool for practicing friction stir welding.

INTRODUCTION

Friction stir welding is a solid state joining process in which a rotating tool engages an assembly of overlapping or abutting metal workpieces to generate frictional heat. The pressure of the rotating tool and the generated frictional heat temporarily softens and plasticizes material from each of the metal workpieces. The plasticized material from each workpiece is sheared around the rotating tool and undergoes visco-plastic solid state deformation while being intimately mixed together and forged within a stir zone. Eventually, upon removal or forward translation of the rotating tool, the consolidated plasticized material hardens into a weld bond that joins the metal workpieces together. The weld bond may be in the form of a spot weld bond or a linear seam weld bond depending on whether the rotating tool engages the assembly in a fixed location (spot weld bond) or is translated along a weld path (linear seam weld bond). Friction stir welding may be applied to both ferrous and non-ferrous metal workpieces, and is particularly useful in joining metal workpieces composed of aluminum, aluminum alloys, magnesium, magnesium alloys, titanium, titanium alloys, copper, and copper alloys.

One particular implementation of friction stir welding involves the use of a bobbin tool. A bobbin tool is a double-sided rotatable tool that includes a top shoulder, a bottom shoulder, and an axial pin that extends between axially spaced apart and facing end surfaces of the top and bottom shoulder. In use, the facing end surfaces of the top and bottom shoulders engage oppositely-facing top and bottom surfaces of the workpiece assembly, respectively, under an applied compressive force, and the axial pin extends through and is contained within the assembly. The axial pin may be retractable within the top shoulder (RPT) in order to dictate the compressive force applied by the end surfaces of the shoulders against their respective top and bottom workpiece surfaces. When rotated about the axis of the axial pin, the spinning end surfaces of the top and bottom shoulders generate and introduce frictional heat into both sides of the workpiece assembly. The two-sided heat input and fully-penetrating axial pin results in a stir zone of consolidated plasticized workpiece material that is rectangular in cross-section and fully traverses the workpiece assembly.

The use of a bobbin tool to carry out friction stir welding has some notable advantages compared to other more conventional tools that include only one shoulder and an axial probe. For one, the fully-penetrating rectangular stir zone produced by a bobbin tool essentially eliminates root flaws in the final weld bond. Root flaws are a source of potential weakness in a friction stir weld bond and their avoidance is typically desired. Moreover, a bobbin tool can friction stir weld complex- and closed-profiled workpiece assemblies that cannot accommodate a backing bar or anvil. A backing bar or anvil is not needed to support the workpiece assembly during friction stir welding with a bobbin tool since the net axial force applied to the workpiece assembly by the top and bottom shoulders is zero. Still further, the spinning top and bottom shoulders of a bobbin tool introduce heat rather uniformly into the workpiece assembly from both sides, which allows for increased travel speeds of the bobbin tool when being translated along a weld path.

Friction stir welding with a bobbin tool has many potential applications because the strength of its solid state weld bond can approach that of the base metal workpieces in the assembly. This is especially true when at least one of metal workpieces in the assembly is formed from a non-ferrous cast metal. Indeed, the stirring action of the bobbin tool and, in particular, the axial pin, deforms and consolidates the plasticized workpiece material in a way that leaves the resultant weld bond in a grain-refined and hot worked condition with essentially no entrapped oxides or porosity, while creating only a minimal heat affected zone surrounding the weld bond. Such characteristics of the friction stir weld bond allow it to attain a strength that may reach 90% of the strength of the base metal workpieces. Friction stir welding with a bobbin tool is thus an attractive joining method when one or all of the workpieces sought to be joined is a cast metal workpiece such as, for instance, when joining a casting to either another casting or an extrusion.

The use of the bobbin tool, however, has conventionally been limited under certain circumstances due to its double-sided structure, including the inability to satisfactorily accommodate an assembly that varies in thickness along a weld path and to be plunged through the workpiece assembly to commence friction stir welding. In these instances, joining techniques that are less susceptible to assembly thickness fluctuations are usually employed, with the most common one being metal inert gas welding (i.e., MIG welding or GMAW). But MIG welding an assembly that includes a cast metal workpiece typically results in a weld joint of around 50% the strength of the base metal workpieces. This disparity in joint strength (compared to FSW) is due primarily to the release of gas porosity entrained within the casting by the heat associated with MIG welding and the significant drop in mechanical properties within the relatively larger heat affected zone. MIG welding also typically causes the weld joint to bulge above the assembly.

SUMMARY

A bobbin tool is disclosed that can friction stir weld a variable thickness workpiece assembly, be axially plunged through the workpiece assembly along an axis of rotation of the bobbin tool, or be axially extracted through the workpiece assembly along an axis of rotation of the bobbin tool. This functionality is provided by one or more blades carried by the bobbin tool and which derive their cutting capacity from the angular velocity of the bobbin tool and its supplied torque. In a preferred embodiment, for example, the bobbin tool includes a top shoulder, a bottom shoulder, and an axial pin that extends between the top and bottom shoulders. The bottom shoulder has an annular shoulder end surface that bears and rotates against a bottom surface of the workpiece assembly, a back surface opposite the aforementioned annular shoulder end surface, and a side surface that joins the annular shoulder end surface and the back surface. One or more and radially-extending blades may be disposed on the side surface of the bottom shoulder and/or one or more axially-extending blades may be disposed on the back surface.

DETAILED DESCRIPTION

A workpiece assembly comprised of overlapping or abutting metal workpieces may have a variable thickness along a weld path where joining is needed. The metal workpieces that make up the assembly may be similar or dissimilar in base metal composition. Each of the workpieces in the assembly may be a ferrous or non-ferrous workpiece and, in particular, may separately be an aluminum-based (i.e., unalloyed aluminum or aluminum alloy) workpiece or a magnesium-based (i.e., unalloyed magnesium or magnesium alloy) workpiece. Additionally, each of the metal workpieces may separately be a casting or an extrusion. Many scenarios exist throughout various manufacturing industries where friction stir welding with a bobbin tool would be an attractive way to join workpieces assemblies of the aforementioned variety. The manufacture of automobile component parts such as cast nodes and crash boxes are just a few such examples. In these situations, however, friction stir welding with a bobbin tool is typically not practiced due to the potential for thickness variations along the weld path.

A bobbin tool 10 that can friction stir weld such a workpiece assembly and is adapted to neutralize thickness variances in the assembly along a weld path is shown in FIGS. 1-4 and described below. As shown best in FIG. 1, the bobbin tool 10 includes a top shoulder 12, a bottom shoulder 14, and an axial pin 16 that extends between the top and bottom shoulders 12, 14 along an axis of rotation 18 of the bobbin tool 10. The various components of the bobbin tool 10 may be separable or integral. The components 12, 14, 16 of the bobbin tool 10 are separable if they can be releasably secured together such as, for example, by any of a variety of mechanical locking engagements. The components 12, 14, 16 are integral, on the other hand, if they are fabricated from a single piece of material and cannot be indestructibly separated from each other. The particular implementation of the bobbin tool 10 shown in the Figures is of the separable variety.

Figure 1:
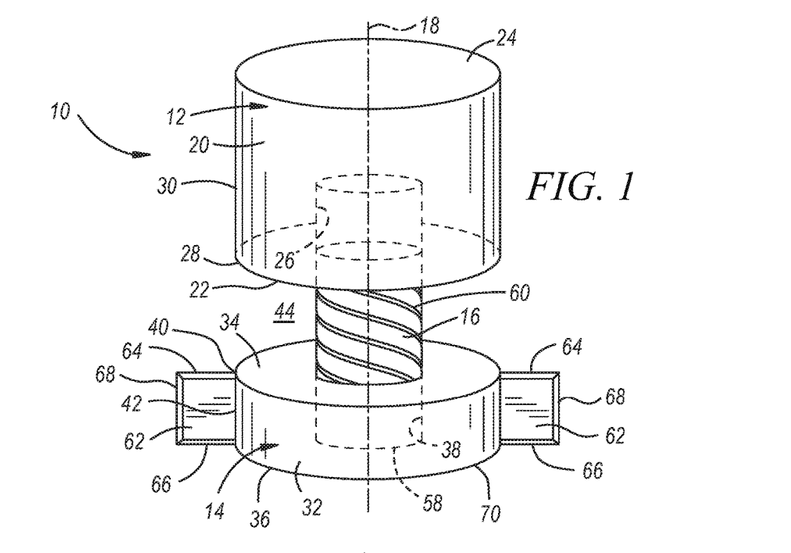
FIG. 1 is an elevated perspective view of a bobbin tool according to one embodiment of the disclosure.

The top shoulder 12 includes a cylindrical or conical body 20 that provides an annular shoulder end surface 22 and a back surface 24 opposite the end surface 22. The body 20 defines a central bore 26 that is open and accessible at the annular shoulder end surface 22 for receipt of the axial pin 16. The annular shoulder end surface 22 thus surrounds the central bore 26 and spans radially outwardly from the central bore 26 to a peripheral edge 28 where the end surface 22 meets a side surface 30 of the body 20. Additionally, while not shown in detail here, the body 20 of the top shoulder 12 is mountable to a powered friction stir drive spindle. The drive spindle is operable to rotate the bobbing tool 10 about the axis of rotation 18 that extends longitudinally through centers of the top shoulder 12, the axial pin 16, and the lower shoulder 14, as shown, and to translate the bobbin tool 10 along a weld path.

The bottom shoulder 14 includes a cylindrical or conical body 32 that provides an annular shoulder end surface 34 and a back surface 36 opposite the end surface 34. The body 32 defines a central opening 38 that is open and accessible at the annular shoulder end surface 34 for receipt of the axial pin 16. The central opening 38 extends from the annular shoulder end surface 34 either fully or partially through the body 32 to the back surface 36 and, accordingly, may be a through hole or a bore. The annular shoulder end surface 34 thus surrounds the central opening 38 and spans radially outwardly from the central opening 38 to a peripheral edge 40 where the end surface 34 meets a side surface 42 of the body 32. Moreover, as shown here, the top and bottom shoulders 12, 14 are axially spaced apart along the axis of rotation 18 such that the annular shoulder end surface 34 of the bottom shoulder 14 and the annular shoulder end surface 22 of the top shoulder 12 face one another and define a gap 44 through which the axial pin 16 extends.

Figure 2:
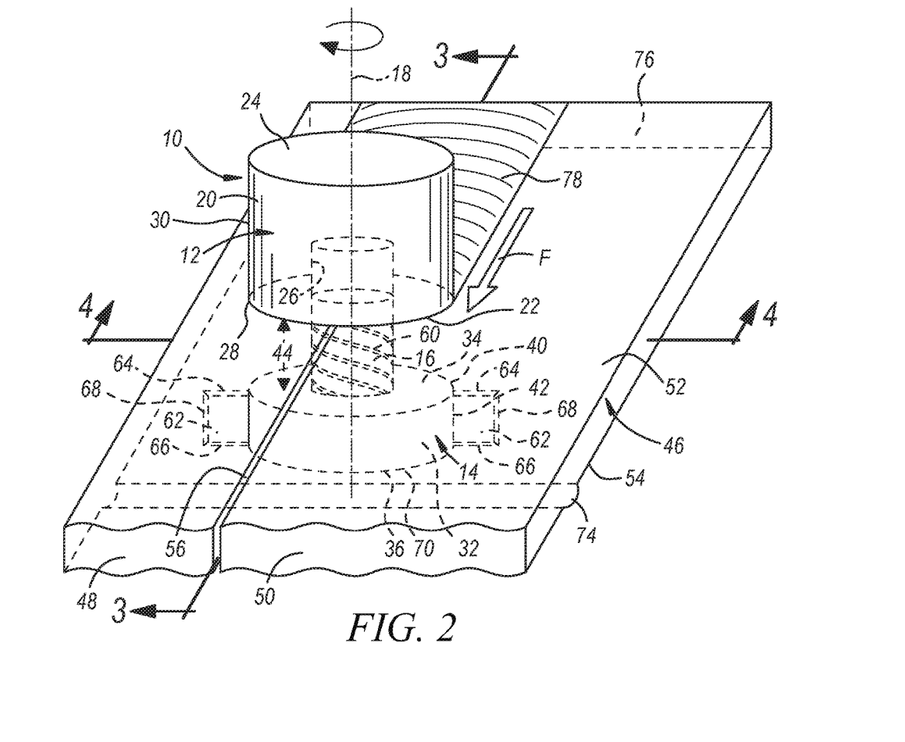
FIG. 2 is a perspective view of the bobbin tool illustrated in FIG. 1 during friction stir welding of a workpiece assembly in which the bobbin tool is translated along a weld path in a forward welding direction to thereby form a weld bond along the weld path.
Figure 3:
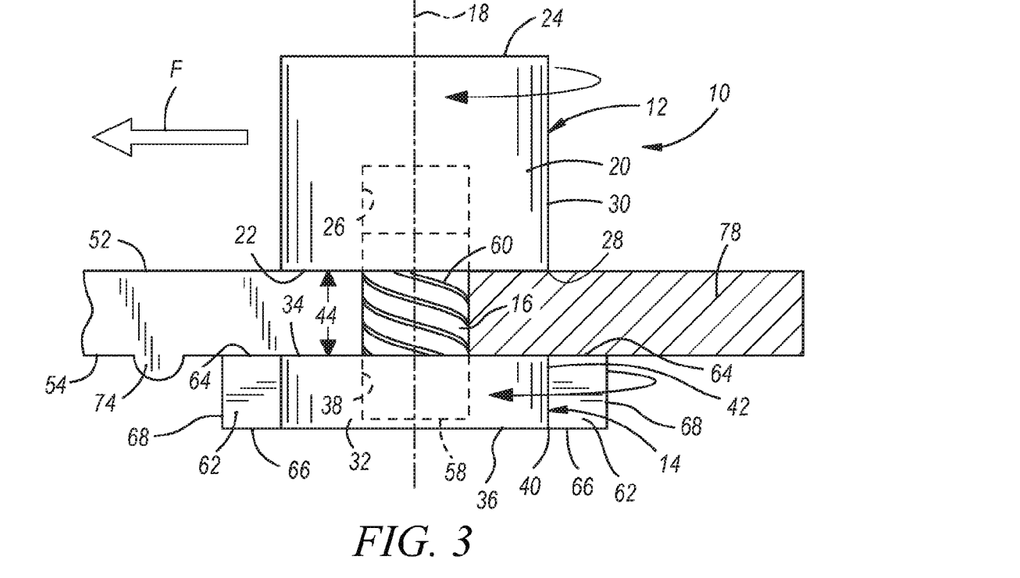
FIG. 3 is a cross-sectional view of the bobbin tool and workpiece assembly of FIG. 2 taken along section lines 3-3.
Figure 4:
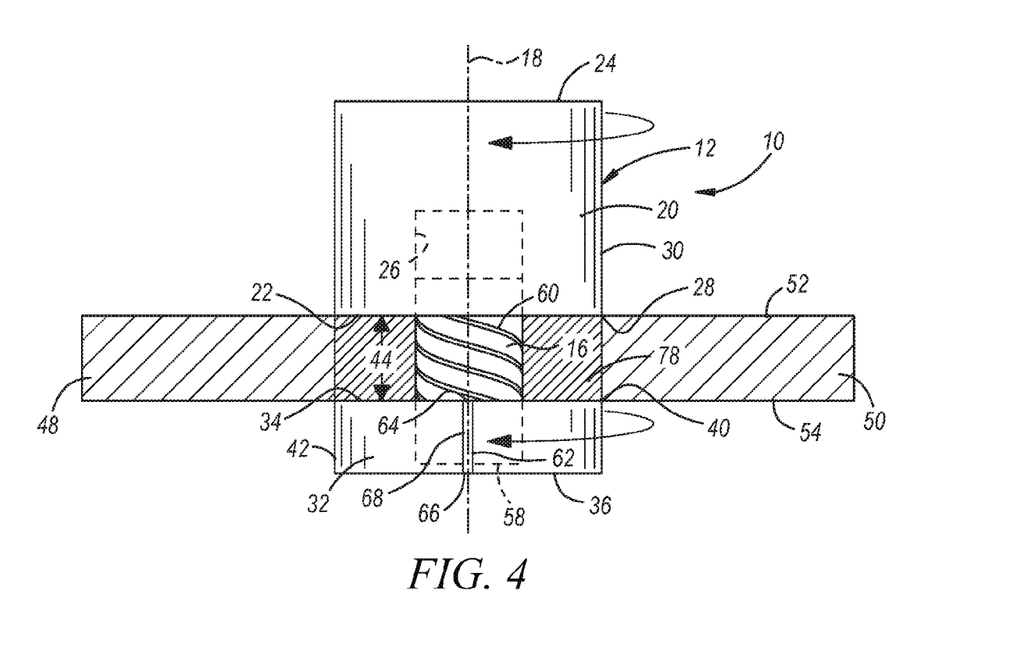
FIG. 4 is a cross-sectional view of the bobbin tool and workpiece assembly of FIG. 2 taken along section lines 4-4.

During friction stir welding, which is illustrated generally in FIGS. 2-4, the gap 44 defined by the top and bottom shoulders 12, 14 accommodates a workpiece assembly 46 that includes first and second non-ferrous light metal workpieces 48, 50. The workpiece assembly 46 includes a top surface 52 and an opposed bottom surface 54 and is passed through the gap 44 as the bobbin tool 10 is translated along a weld path 56 in a forward welding direction (identified by arrow F). The weld path 56 may encompass a joint line between abutting edges of the first and second light metal workpieces 48, 50, as shown here, or it may be located along a portion of the workpiece assembly 46 where the two light metal workpieces 48, 50 are superimposed in a lapped arrangement. The workpiece assembly 46 may assume a closed profile or other complex shape since an anvil or backing bar is not needed to support the bobbin tool 10. A supporting anvil or backing bar is not needed because, unlike a conventional friction stir welding tool, the bobbin tool 10 applies a net axial force of zero on the workpiece assembly 46 when being translated along the weld path 56.

The annular shoulder end surfaces 22, 34 of the top and bottom shoulders 12, 14 are intended to bear and rotate against the top and bottom workpiece assembly surfaces 52, 54, respectively, during translation of the bobbin tool 10 in the forward welding direction F. To that end, the annular shoulder end surfaces 22, 34 are designed to generate heat through friction and material deformation and to produce a stirring and forging action at their respective workpiece assembly surfaces 52, 54 when engaged in that type of pressed rotational activity. In a preferred embodiment, for example, each of the annular shoulder end surfaces 22, 34 includes spiraled scrolls that run from its peripheral edge 28, 40 the central bore 26 or opening 38. Other types of surface features may of course be included on the annular shoulder end surfaces 22, 34 in lieu of spiraled scrolls including ridges, knurling, grooves, concave or convex shaped surfaces, and scoops, to name but a few examples. The annular shoulder end surfaces 22, 34 of the top and bottom shoulders 12, 14 may or may not be similarly sized; that is, the peripheral edges 28, 40 of the annular end surfaces 22, 34 may be circumferentially aligned, as shown, but are not necessarily required to exhibit such symmetry depending on the nature and objectives of the friction stir welding process.

Referring now back to FIGS. 1-2, the axial pin 16 is held within the central bore 26 of the body 20 of the top shoulder 12 and includes a distal end 58 that extends past the annular shoulder end surface 22 along the axis of rotation 18 of the tool 10. The distal end 58 is received in the central opening 38 of the body 32 of the bottom shoulder 14 and is fixedly secures the bottom shoulder 14 to the axial pin 16 in a way that prevents relative movement between the two components 14, 16. The axial pin 16 may be retractably supported within the central bore 26 of the body 20 of the top shoulder 12 including, for example, by known retractable pin technology (RPT). This allows for control over the size of the gap 44 between the two facing shoulder end surfaces 22, 34 and the compressive force applied on the workpiece assembly 46 by the shoulders 12, 14. The axial pin 16 may assume any of a wide variety of shapes (e.g., cylindrical, truncated conical, etc.) suitable for use with the non-ferrous light metal workpieces 48, 50 and preferably includes external stir enhancing features 60 such as an external helical threading. The individual threads that make up the external helical threading may be sharp or blunted.

The bobbin tool 10 includes structural provisions in the form of one or more blades 62 that cut through thickness variances along the weld path 56 in advance of the forward translation of the bobbin tool 10. In particular, the one or more blades 62 are disposed on and extend radially outwardly from the side surface 42 of the body 32 of the bottom shoulder 14. Each of the blades 62 includes a first radial cutting edge 64, a second radial cutting edge 66, and an axial cutting edge 68 that interconnects the first and second radial cutting edges 64, 66. The first radial cutting edge 64 extends radially outwardly from the peripheral edge 40 of the annular shoulder end surface 34 of the bottom shoulder 14. Likewise, in a preferred embodiment, the second radial cutting edge 66 extends radially outwardly from a peripheral edge 70 of the back surface 36 of the bottom shoulder 14. The axial cutting edge 68 runs axially alongside the side surface 42 of the body 32 between the first and second cutting edges 64, 66 and is parallel to the axis of rotation 18 of the bobbin tool 18 or is angled in some way to the axis of rotation 18. Anywhere from one to ten such blades 62 may be circumferentially disposed around the side surface 42 of the body 32.

Figure 7:
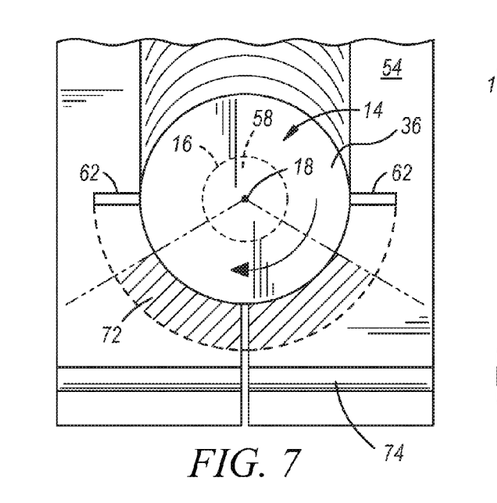
FIG. 7 is a plan view showing translation of the bottom shoulder of the bobbin tool along the bottom surface of the workpiece assembly.

The cutting edges 64, 66, 68 of the one or more blades 62 are sharp to facilitate cutting through portions of the workpiece assembly 46 during operation of the bobbin tool 10. Most notably, when the bobbin tool 10 is being rotated about its axis of rotation 18 and translated along the weld path 56 of the workpiece assembly 46, the axial cutting edge 68 of the blade(s) 62 sweeps through an arcuate path 72, as depicted in FIG. 7, in advance of the forward movement of the bottom shoulder 14 along the welding direction F. The angular velocity of the axial cutting edge 68 and the torque supplied by friction stir drive spindle is sufficient to carve through portions 74 of the workpiece assembly 46 that are thicker than the gap 44 defined by the top and bottom shoulders 12, 14. By clearing the intentionally and unintentionally thicker portions 74 of the workpiece assembly 46 within the arcuate path 72 ahead of the bottom shoulder 14, the bobbin tool 10 can travel unobstructed along the weld path 56, leading to good friction stir welding success.

The first and second radial cutting edges 66, 68 of the blade(s) 62 can help the bottom shoulder 14 of the bobbin tool 10 pass through the workpiece assembly 46 at the beginning and end of the weld path 56. For instance, when the bobbin tool 18 is rotating, the second radial cutting edge 66 has enough cutting capacity to permit the bottom shoulder 14 to be plunged through the workpiece assembly 46 from the top surface 52 to the bottom surface 54 in an axially downward direction along the axis of rotation 18. The ability to plunge the bottom shoulder 14 through the workpiece assembly 46 allows the bobbin tool 10 to commence friction stir welding at any point on the assembly 46. Such flexibility compares favorably to conventional friction stir welding practices that generally required access to a free edge 76 of a workpiece assembly in order to launch a bobbin tool along a predefined weld path. Similar to the second radial cutting edge 66 of the blade(s) 62, the first radial cutting edge 64 of the blade(s) 62 has enough cutting capacity to permit the bottom shoulder 14 to be extracted through the workpiece assembly 46 from the bottom surface 54 to the top surface 52 in an axially upward direction along the axis of rotation 18, which allows the bobbin tool 10 to be removed from the assembly 46 at anytime.

A method of using the bobbin tool 10 with its various cutting capabilities as provided by the one or more blades 62 on the bottom shoulder 14 is illustrated with specific reference to FIGS. 1 and 3-4. To begin, the bobbin tool 10 is brought to a beginning of the weld path 56, at which point the workpiece assembly 46 is received within the gap 44 defined by the top and bottom shoulders 12, 14. This may occur in several ways. For one, the axial pin 16 of the bobbin tool 10 may be located at the free edge 76 of the workpiece assembly 46 with the annular shoulder end surfaces 22, 34 of the top and bottom shoulders 12, 14 bearing against the top and bottom workpiece assembly surfaces 52, 54. The rotation of the bobbin tool 18 on its axis of rotation 18, and the corresponding rotation of the axial pin 16 against the free edge 76, eventually begins to plasticize the workpiece assembly 46 at the free edge 76 due to frictional heat and workpiece material deformation induced by the various components 12, 14, 16 of the bobbin tool 10. The bobbin tool 10, while still rotating, may then be moved to the beginning of the weld path 56 if the original location of the bobbin tool 10 against the free edge 76 of the assembly 46 does not constitute the beginning.

As an alternative to accessing the beginning of the weld path 56 through the free edge 76 of the workpiece assembly 46—either because such a free edge 76 is not available or because doing so is less desired—the bottom shoulder 14 of the bobbin tool 10 may be plunged axially downward along the axis of rotation 18 and through the assembly 46 to locate its annular shoulder end surface 34 against the bottom surface 54 of the assembly 46. With the annular shoulder end surfaces 22, 34 of the top and bottom shoulders 12, 14 bearing against the top and bottom workpiece assembly surfaces 52, 54, the bobbin tool 10 rotates in place until the axial pin 16 and the annular shoulder end surfaces 22, 34 begin to plasticize the workpiece assembly 46. The bobbin tool 10, while still rotating, may then be moved to the beginning of the weld path 56 if the original plunging location of the bobbin tool 10 into the workpiece assembly 46 does not constitute the beginning.

The rotating bobbin tool 10 is translated in the forward welding direction F along the weld path 56 from the beginning of the weld path 56 to the end. During the movement of the bobbin tool 10 along the forward welding direction F, the rotation of the axial pin 16 and the compressive force applied by the facing shoulder end surfaces 22, 34 generates enough frictional heat to soften and plasticize material from each of the light metal workpieces 48, 50. The plasticized material from each of the light metal workpieces 48, 50 is sheared around the axial pin 16 and undergoes visco-plastic solid state deformation while being intimately mixed together within a stir zone. The intermixed plasticized material within the stir zone cools and hardens in the wake of the translation of the bobbin tool 10 in the forward welding direction F to form a weld bond 78 that joins the light metal workpieces 48, 50 together. At the end of the weld path 56, the bobbin tool 10 may be translated through another free edge of the workpiece assembly 46 or, alternatively, the bobbin tool 10 may be extracted upwardly along the axis of rotation 18 through the workpiece assembly 46 with the help of the cutting capability of first radial cutting edge 64 of the blade(s) 62.

The bottom surface 54 of the workpiece assembly 46 may, as previously indicated, include one or more portions 74 that project away from the bottom surface 54 to render the workpiece assembly 46 thicker than the gap 44 established between the top and bottom shoulders 12, 14 at those locations. The portion(s) 74 may be a strengthening rib or other surface projection that lies transverse to or even alongside the weld path 56. And, unlike thickness variations that fall within normal manufacturing tolerances or other intentional or unintentional gradual variations in thickness of the workpiece assembly 46, the one or more thicker portions 74 are abrupt deviations in thickness that are not easily accommodated by RPT or other floating bobbin tool designs. In a typical scenario, for example, the one or more thicker portions 74 may have a maximum thickness deviation D away from the bottom surface 54 of the workpiece assembly 46 that ranges from 0.1 mm to 10 mm.

Ordinarily, and even with the assistance of RPT, the thicker portions 74 would be engaged by the side surface 42 of the body 32 of the rotating bottom shoulder 14 during translation of the bobbin tool 10 along the weld path 56, resulting in unkempt plasticization of the portion 74 and unpredictable variances in the quality and aesthetics of the weld bond 78. Forcing the bottom shoulder 14 through the thicker portions 74 in this way may also lead to failure of the bobbin tool 10 or the need to take the tool 10 off-line for restorative maintenance. Such complications are not encountered here when using the disclosed bobbin tool 10. To be sure, the axial cutting edge(s) 68 of the one or more blades 62 disposed on the bottom shoulder 14 carve through, and consequently clear away, any of the encountered thicker portions 74 as the blades sweep through the arcuate path 72 in front of the bottom shoulder 14 as the bobbin tool 10 is translated along the weld path 56 in the forward welding direction F.

Because the one or more blades 62 carve through the thicker portions 74 present on the bottom surface 54 in advance of the forward movement of the bobbin tool 10 along the weld path 56, the workpiece assembly 46 as received in the gap 44 defined by the top and bottom annular shoulder end surfaces 22, 34 of the bobbin tool 10 has essentially a constant thickness along the entire weld path 56. The sections of the thicker portions 74 not intersected by the angular trajectory of the one or more blades 62 remain undisturbed and, thus, continue to perform their designated function outside of the weld path 56. For example, if the thicker portions 74 are strengthening ribs spaced periodically along the bottom surface 54 of the workpiece assembly 46, the ribs will continue to provide a strengthening effect along the bottom surface 54 right up to the weld bond 78. The use of the bobbin tool 10 described herein achieves a sound balance between retaining the function of the thicker portions 74 on the bottom surface 54 of the workpiece assembly 46 and allowing good joining through friction stir welding along a designated weld path 56 that traverses the thicker portions 46.

Figure 5:
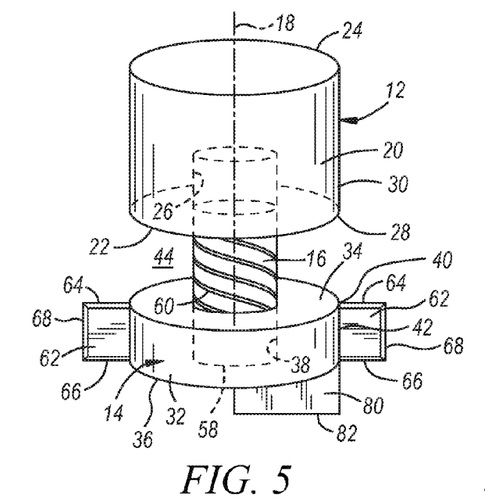
FIG. 5 is an elevated perspective view of a bobbin tool according to yet another embodiment of the disclosure.
Figure 6:
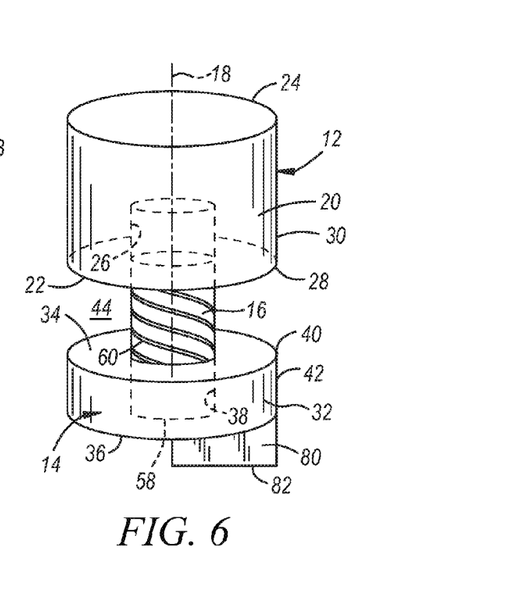
FIG. 6 is an elevated perspective view of a bobbin tool according to still another embodiment of the disclosure.
Figure 8:
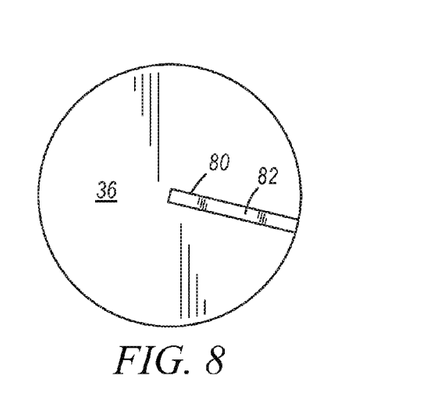
FIG. 8 is a plan view of the back surface of the bottom shoulder of the bobbin tool depicted in FIG. 6.

The bobbin tool 10 has several alternate configurations that may be implemented while maintaining one or more of the capabilities described above. In one embodiment, for instance, as shown in FIG. 5, the bobbin tool 10 may optionally include a blade 80 that extends axially on the back surface 36 of the bottom shoulder 14. The blade 80 includes a radial cutting edge 82 that projects radially from at least a center of the of the back surface 36 to the peripheral edge 70 while being axially spaced from the back surface 36. In one embodiment, as shown, the blade 80 may project radially from the center to the peripheral edge 70 of the back surface 36. In another embodiment, however, the blade 80 may project radially from one point on the peripheral edge 70, through the center of the back surface 36, and to a diametrically opposed point on the peripheral edge 70, such as when the blade 80 projects entirely across the back surface 36. The blade 80 provides additional cutting capacity to help plunge the bottom shoulder 14 of the bobbin tool 10 through the workpiece assembly 46 in an axially downward direction along the axis of rotation 18. More than one such blade 80 may be included on the back surface 36 such as, for example, a plurality of blades 80 with each blade 80 projecting radially from a center of the back surface 36 to the peripheral edge 70 of the back surface 36. In still another embodiment, as shown in FIGS. 6 and 8, the bobbin tool 10 may include the blade 80 on the back surface 36 but not the one or more blades 68 on the side surface 42.

The above description of preferred exemplary embodiments and specific examples are merely descriptive in nature; they are not intended to limit the scope of the claims that follow. Each of the terms used in the appended claims should be given its ordinary and customary meaning unless specifically and unambiguously stated otherwise in the specification.

The invention claimed is:

1. A bobbin tool for friction stir welding, the bobbin tool comprising:
   a top shoulder having an annular shoulder end surface;
   a bottom shoulder having an annular shoulder end surface, a back surface opposite the annular shoulder end surface of the bottom shoulder, and a side surface that joins the annular shoulder end surface and the back surface of the bottom shoulder, the annular shoulder end surface of the bottom shoulder being spaced from and facing the annular shoulder end surface of the top shoulder to define a gap between the annular shoulder end surface of the top shoulder and the annular shoulder end surface of the bottom shoulder;
   an axial pin that extends between the top shoulder and the bottom shoulder along an axis of rotation of the bobbin tool and through the gap defined by the annular shoulder end surface of the top shoulder and the annular shoulder end surface of the bottom shoulder; and a blade that extends axially from the back surface of the bottom shoulder, wherein the blade that extends axially from the back surface of the bottom shoulder includes a radial cutting edge that projects radially from at least a center of the of the back surface to a peripheral edge of the back surface.

2. The bobbin tool set forth in claim 1, wherein the axial pin is retractable within the top shoulder.

3. The bobbin tool set forth in claim 1, wherein the top shoulder, the bottom shoulder, and the axial pin that extends between the top shoulder and the bottom shoulder are separable.

4. The bobbin tool set forth in claim 1, wherein the top shoulder, the bottom shoulder, and the axial pin that extends between the top shoulder and the bottom shoulder are integral.

5. A bobbin tool for friction stir welding, the bobbin tool comprising:
   a top shoulder having a body that provides an annular shoulder end surface;
   a bottom shoulder having a body that provides an annular shoulder end surface, a back surface opposite the annular shoulder end surface, and a side surface that joins the annular shoulder end surface and the back surface of the bottom shoulder, the annular shoulder end surface of the bottom shoulder being spaced from and facing the annular shoulder end surface of the top shoulder;
   an axial pin that extends between the top shoulder and the bottom shoulder along an axis of rotation of the bobbin tool and through a gap defined by the annular shoulder end surface of the top shoulder and the annular shoulder end surface of the bottom shoulder; and
   a plurality of blades that extend radially outwardly from, and are circumferentially spaced around, the side surface of the bottom shoulder, each of the plurality of blades being planar and comprising an axial cutting edge that runs alongside the side surface of the bottom shoulder from a peripheral edge of the annular shoulder end surface of the bottom shoulder to a peripheral edge of the back surface of the bottom shoulder.

6. The bobbin tool set forth in claim 5, further comprising:
   a blade that extends axially from the back surface of the bottom shoulder, wherein the blade that extends axially from the back surface of the bottom shoulder includes a radial cutting edge that projects radially from at least a center of the of the back surface to the peripheral edge of the back surface.

7. The bobbin tool set forth in claim 5, wherein the plurality of blades that extend radially outwardly from, and are circumferentially spaced around, the side surface of the bottom shoulder includes between two and ten such blades.

8. The bobbin tool set forth in claim 5, wherein the axial pin is held within a central bore of the top shoulder and includes a distal end that is received in a central opening of the bottom shoulder to fixedly secure the bottom shoulder to the axial pin.

9. The bobbin tool set forth in claim 8, wherein the axial pin is retractable within the top shoulder.

10. A method of friction stir welding with a friction stir welding bobbin tool, the method comprising:
    providing a bobbin tool that includes a top shoulder having an annular shoulder end surface, a bottom shoulder having an annular shoulder end surface that is spaced from and faces the annular shoulder end surface of the top shoulder so as to define a gap between the annular shoulder end surfaces, and an axial pin that extends between the top shoulder and the bottom shoulder along an axis of rotation of the bobbin tool, the bobbin tool further comprising a blade that extends radially outwardly from a side surface of the bottom shoulder and which comprises an axial cutting edge that runs alongside the side surface of the bottom shoulder;
    receiving a workpiece assembly within the gap defined by the annular shoulder end surface of the top shoulder and the annular shoulder end surface of the bottom shoulder, the workpiece assembly comprising a first metal workpiece and a second metal workpiece to be joined;
    rotating the bobbin tool about its axis of rotation while the workpiece assembly is received in the gap and the annular shoulder end surface of the top shoulder bears against a top surface of the workpiece assembly and the annular shoulder end surface of the bottom shoulder bears against a bottom surface of the workpiece assembly, the bottom surface of the workpiece assembly including a strengthening rib; and
    translating the bobbin tool along a weld path in a forward welding direction while rotating the bobbin tool to intermix plasticized material from each of the first metal workpiece and the second metal workpiece to produce a weld bond in a wake of the bobbin tool as the bobbin tool moves in the forward welding direction, the axial cutting edge of the blade sweeping through an arcuate path in advance of the bottom shoulder as the bobbin tool is translating along the weld path, and wherein, when translating along the weld path in the forward welding direction, the axial cutting edge carves through the strengthening rib when the strengthening rib enters the arcuate path of the axial cutting edge.

11. The method set forth in claim 10, wherein the blade further comprises a first radial cutting edge extending from a peripheral edge of the annular shoulder end surface of the bottom shoulder and a second radial cutting edge extending from a peripheral edge of a back surface of the bottom shoulder, and wherein the axial cutting edge runs between and connects the first and second radial cutting edges.

12. The method set forth in claim 11, further comprising:
    plunging the bottom shoulder through the workpiece assembly from the top surface of the workpiece assembly to the bottom surface of the workpiece assembly in an axially downward direction along the axis of rotation while the bobbin tool is rotating in order to receive the workpiece assembly within the gap defined by the annular shoulder end surface of the top shoulder and the annular shoulder end surface of the bottom shoulder, the second radial cutting edge of the blade cutting through the workpiece assembly to facilitate plunging of the bottom shoulder; or
    extracting the bottom shoulder through the workpiece assembly from the bottom surface of the workpiece assembly to the top surface in an axial upward direction along the axis of rotation to remove the workpiece assembly from the gap defined by the annular shoulder end surface of the top shoulder and the annular shoulder end surface of the bottom shoulder, the first radial cutting edge of the blade cutting through the workpiece assembly to facilitate extraction of the bottom shoulder.

13. The bobbin tool set forth in claim 5, wherein each of the plurality of blades further comprises a first radial cutting edge extending from the peripheral edge of the annular shoulder end surface of the bottom shoulder and a second radial cutting edge extending from the peripheral edge of the back surface of the bottom shoulder, and wherein the axial cutting edge runs between and connects the first and second radial cutting edges.

14. The bobbin tool set forth in claim 5, wherein the axial cutting edge of each of the plurality of blades runs axially alongside the side surface of the bottom shoulder parallel to the axis of rotation of the bobbin tool.

* * * * *